A. Randall.
Shear Boom.

No. 86,588. Patented Feb. 2, 1869.

Witnesses:

Inventors
Clarence Randall
James F. Moore
John Randall
per administrators
Alexander & Mason
Attys.

United States Patent Office.

CLAMENZIE RANDALL, JAMES F. MOORE, AND JOHN RANDALL, OF WEST EAU CLAIRE, WISCONSIN, ADMINISTRATORS OF THE ESTATE OF ADIN RANDALL, DECEASED.

Letters Patent No. 86,588, dated February 2, 1869.

SHEAR-BOOM.

The Schedule referred to in these Letters Patent and making part of the same.

*To all whom it may concern:*

Be it known that ADIN RANDALL, of West Eau Claire, in the county of Eau Claire, and in the State of Wisconsin, invented certain new and useful Improvements in Shear-Boom and Pontoon-Bridge; and we do hereby declare that the following is a full, clear, and exact description thereof, reference being had to the accompanying drawings, and to the letters of reference marked thereon.

The nature of said invention consists in the application of wings or rudders to a boom, for shearing logs, lumber, timber, rafts, or any material floating upon water, from one side, or any part of a stream of water, to the other side, so as to control the same within a given or desired place, for manufacture or otherwise, by hanging said wings or rudders upon hinges, or otherwise, on a side of the boom, made of one or more timbers, however long, with the lower end loose, and the upper end hung to the shore, or to a pier on the shore, or in any part of the river, and controlled by ropes or chains from the shore, or upon the boom, so that one person can, by turning a crank, or other suitable device, move one end of said wings or rudders from the boom against the current, so as to throw the lower end of the boom out into the river, or even across the river, and hold the same there at will, thus forming a bridge for passengers and teams to cross.

In order to enable others skilled in the art to which his invention appertains, to make and use the same, we will now proceed to describe its construction and operation, referring to the annexed drawings, which form a part of this specification, and in which—

Figure 1:
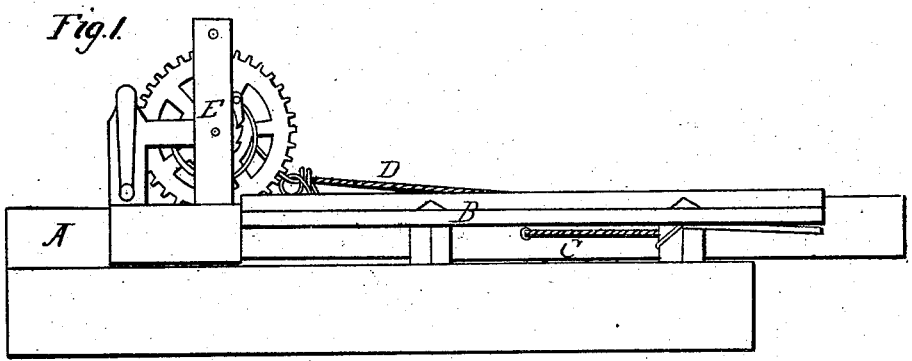
Figure 1 is a side view.
Figure 2:
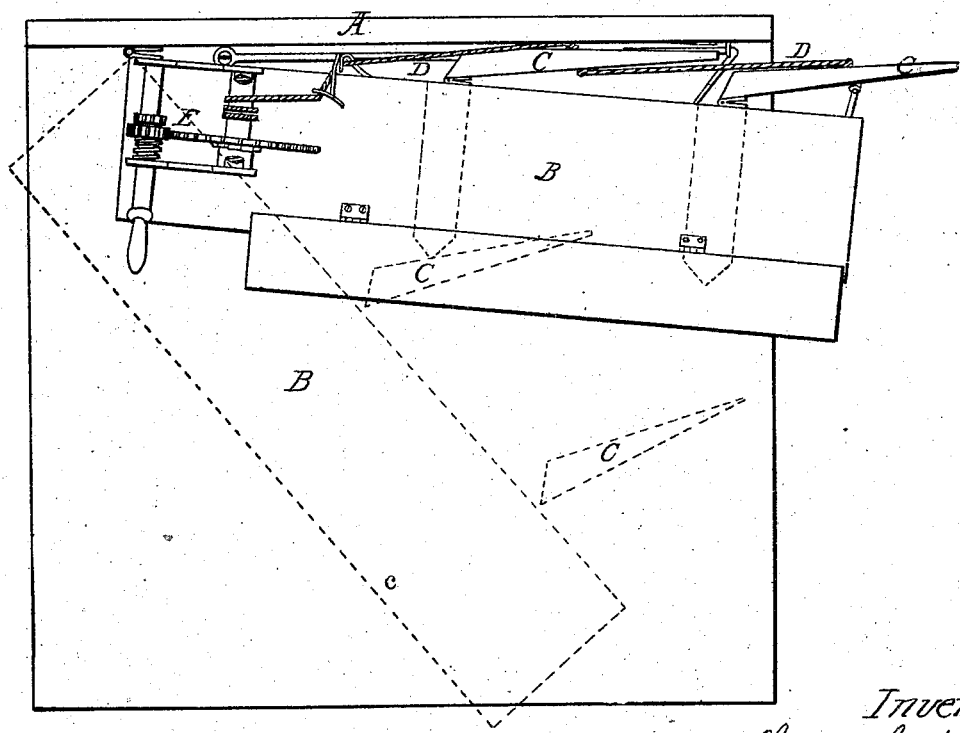
Figure 2 is a plan view.

A represents the land side of a stream of water, to which is hung, in some suitable manner, the upper end of the boom B, the lower end of the same being loose down the stream.

The boom B may be made of any length desired, and is on its inner side provided with wings or rudders, C C, hung to the same by hinges or other suitable means.

The wings C C are connected together by a rope or chain, D, which passes through all of them, and leads to a crank, E, placed on the upper hinged end of the boom.

By now turning the crank E the wings, C C are thrown out from the boom B, and the current of water, striking said wings or rudders, throws the boom across the river diagonally, and by securing the wings or rudders C C at the required angle, by means of said crank, the boom will remain in such position as may be desired, to catch any logs, &c., and convey them to the place where they are wanted.

When it is desired to withdraw the boom D from the stream, it is only necessary to turn the crank E in the opposite direction, when the wings C C will, by the action of the current, close to their proper places along the boom, and the boom turn on its pivot until it is again along the shore.

The same principle can be applied for throwing pontoon-bridges across a river. The bridge can then be made entire on one side of the river, and by the application of the wings or rudders it can be thrown across with perfect ease, even on the broadest river known, it does not matter how strong the current; in fact, the stronger the current, the better, as it is the force of the current alone, guided by the wings or rudders, which throws it across.

Having thus fully described his invention,

What we claim as new, and desire to secure by Letters Patent, is—

1. The application of wings or rudders to a boom or bridge, for the purpose of throwing the same partly or wholly across a river, substantially as herein set forth.

2. The boom B, hung at one end, and provided with a suitable number of wings or rudders, C C, hinged to its inner side, and operated by a rope, D, and crank E, or their equivalents, substantially as and for the purposes herein set forth.

In testimony that we claim the foregoing, we have hereunto set our hands, this 14th day of October, 1868.

CLAMENZIE RANDALL.
JAMES F. MOORE.
JOHN RANDALL.

Witnesses:
H. A. PALMER,
W. W. DYANNAN.